United States Patent
Honda

(10) Patent No.: US 9,819,139 B2
(45) Date of Patent: Nov. 14, 2017

(54) GAS LASER OSCILLATOR HAVING AUXILIARY ELECTRODES

(71) Applicant: FANUC CORPORATION, Yamanashi (JP)

(72) Inventor: Masahiro Honda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/284,749

(22) Filed: Oct. 4, 2016

(65) Prior Publication Data

US 2017/0098918 A1    Apr. 6, 2017

(30) Foreign Application Priority Data

Oct. 5, 2015 (JP) ................. 2015-197751

(51) Int. Cl.

| | | |
|---|---|---|
| H01S 3/03 | (2006.01) | |
| H01S 3/097 | (2006.01) | |
| H01S 3/038 | (2006.01) | |
| H01S 3/07 | (2006.01) | |
| H01S 3/0971 | (2006.01) | |
| H01S 3/0975 | (2006.01) | |
| H01S 3/104 | (2006.01) | |

(Continued)

(52) U.S. Cl.
CPC ............. *H01S 3/097* (2013.01); *H01S 3/03* (2013.01); *H01S 3/0384* (2013.01); *H01S 3/07* (2013.01); *H01S 3/073* (2013.01); *H01S 3/0975* (2013.01); *H01S 3/09702* (2013.01); *H01S 3/09713* (2013.01); *H01S 3/104* (2013.01); *H01S 3/036* (2013.01); *H01S 3/041* (2013.01)

(58) Field of Classification Search
CPC ........ H01S 3/097; H01S 3/07; H01S 3/09713; H01S 3/0975; H01S 3/09702; H01S 3/073; H01S 3/03; H01S 3/0384
See application file for complete search history.

(56) References Cited

U.S. PATENT DOCUMENTS 6,137,818 A   10/2000  Jackson
6,665,327 B1  12/2003  von Borstel et al.
(Continued)

FOREIGN PATENT DOCUMENTS

JP    60-161687 A    8/1985
JP    S64022082 A    1/1989
(Continued)

*Primary Examiner* — Yuanda Zhang
(74) *Attorney, Agent, or Firm* — RatnerPrestia

(57) ABSTRACT

A gas laser oscillator includes laser gas circulation paths including first and second paths; a first discharge tube provided in the first path; a second discharge tube provided in the second path; a laser power supply for supplying a first high frequency power to the first discharge tube and supplying a second high frequency power having a different phase from the first high frequency power to the second discharge tube; and a matching unit including a first coil and a first capacitor, and a second coil and a second capacitor. Each value of the first coil, the first capacitor, the second coil, and the second capacitor is determined such that the difference between the peak value of a voltage applied to the first discharge tube and the peak value of a voltage applied to the second discharge tube falls within a predetermined range.

2 Claims, 8 Drawing Sheets

(51) Int. Cl.
*H01S 3/036* (2006.01)
*H01S 3/041* (2006.01)

(56) References Cited

U.S. PATENT DOCUMENTS

| | | | | |
|---|---|---|---|---|
| 6,895,030 | B1* | 5/2005 | Hayashikawa | H01S 3/03 |
| | | | | 372/55 |
| 8,929,414 | B2 | 1/2015 | Honda et al. | |
| 9,130,343 | B2 | 9/2015 | Nukui | |
| 2006/0280213 | A1* | 12/2006 | Egawa | H01S 3/073 |
| | | | | 372/38.02 |
| 2008/0144681 | A1* | 6/2008 | Egawa | H01S 3/104 |
| | | | | 372/38.04 |
| 2008/0304533 | A1* | 12/2008 | Ando | H01S 3/0014 |
| | | | | 372/58 |
| 2009/0116521 | A1* | 5/2009 | Ando | H01S 3/097 |
| | | | | 372/33 |
| 2011/0243165 | A1* | 10/2011 | Honda | H01S 3/073 |
| | | | | 372/29.021 |
| 2011/0243168 | A1* | 10/2011 | Ikemoto | H01S 3/0971 |
| | | | | 372/38.07 |
| 2013/0016747 | A1* | 1/2013 | Honda | H01S 3/09702 |
| | | | | 372/38.02 |
| 2014/0064317 | A1* | 3/2014 | Honda | H01S 3/09702 |
| | | | | 372/61 |
| 2015/0372441 | A1* | 12/2015 | Honda | H01S 3/032 |
| | | | | 372/38.02 |

FOREIGN PATENT DOCUMENTS

| | | |
|---|---|---|
| JP | H10178225 A | 6/1998 |
| JP | H11274622 A | 10/1999 |
| JP | 2000101171 A | 4/2000 |
| JP | 2006344722 A | 12/2006 |
| JP | 2013-247261 A | 12/2013 |
| JP | 2014053423 A | 3/2014 |
| JP | 2014192199 A | 10/2014 |
| JP | 2014207329 A | 10/2014 |

* cited by examiner

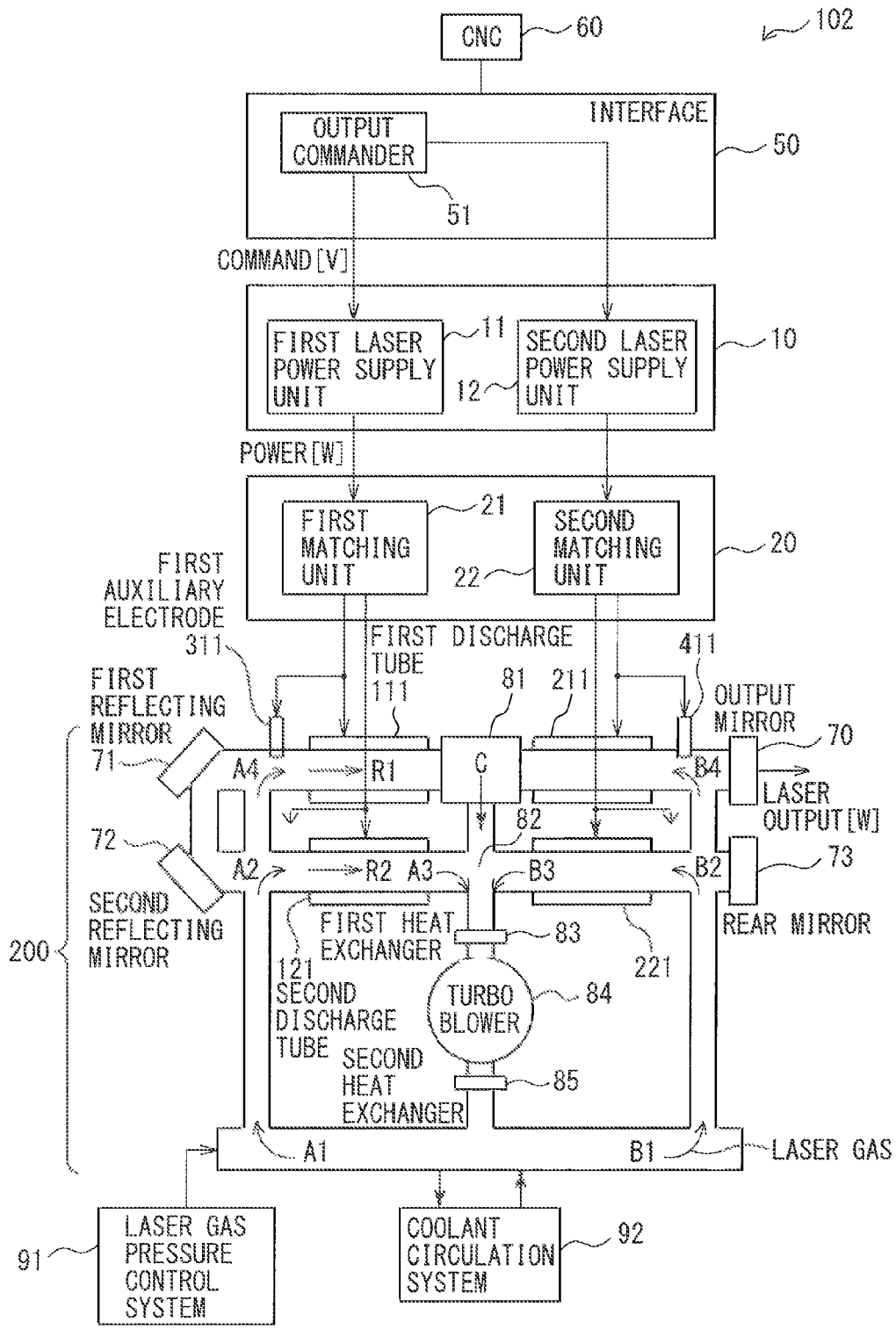

GAS LASER OSCILLATOR HAVING AUXILIARY ELECTRODES

This application is a new U.S. patent application that claims benefit of JP 2015-197751 filed on Oct. 5, 2015, the content of 2015-197751 is incorporated herein by reference.

BACKGROUND OF THE INVENTION

1. Field of the Invention

The present invention relates to a gas laser oscillator, and in particular relates to a as laser oscillator having auxiliary electrodes.

2. Description of Related Art

Gas laser oscillators including a laser power supply that can output high frequency powers having a phase difference of 180 degrees to two laser gas circulation paths are known (for example, Japanese Unexamined Patent Publication (Kokai) No. S60-161687 hereinafter referred to as "patent document 1", and Japanese Unexamined Patent Publication (Kokai) No. 2013-247261 hereinafter referred to as "patent document 2"). The gas laser oscillators include a matching unit constituting coils and capacitors to be used for impedance matching with discharge loads (discharge tubes, auxiliary electrodes, and a laser gas), in other words, to produce resonance so as to maximize discharge tube voltages. The laser power supply supplies the high frequency powers to a plurality of discharge tubes and auxiliary electrodes through the matching unit.

To start a discharge (main discharge) of the discharge tube, a discharge (auxiliary discharge) of the auxiliary electrode is required to have already been started. Increasing the output of the laser power supply, in a state of not starting the auxiliary discharge, causes an excessive voltage to be applied to the discharge tube and an excessive current to flow through the laser power supply, thus resulting in a break in each of the discharge tube and the laser power supply or a stop of the gas laser oscillator while issuing an alarm.

The patent document 1 discloses a technique in which auxiliary electrodes are provided upstream of discharge tubes through which a laser gas circulates. Electrons are supplied by an auxiliary discharge, before starting a main discharge, to ensure that the main discharge is stably started. However, this technique requires as many auxiliary electrodes as the number of the discharge tubes, thus causing a difficulty in cost reduction.

The patent document 2 discloses a technique in which through-holes are provided in discharge tubes, and a main discharge is stabilized by increasing the number of auxiliary electrodes. However, this technique requires, as well as an increase in cost of the discharge tubes themselves, an exchange of the expensive discharge tubes and the auxiliary electrodes on a regular basis. Furthermore, this technique increases the risk of bringing serious leakage problems such as a reduction in a laser power and a break in the discharge tube owing to an arc discharge, in the event that a laser gas leaks from portions (O-rings) of the auxiliary electrodes.

As described above, the conventional art has a problem that as many auxiliary electrodes as the number of discharge tubes are required to ensure that a main discharge is stably started.

SUMMARY OF THE INVENTION

The present invention aims at providing a gas laser oscillator that has a faster discharge rise time than in conventional gas laser oscillators.

A gas laser oscillator according to an embodiment of the present invention includes a plurality of laser gas circulation paths including a first path and a second path; a first discharge tube provided in the first path; a second discharge tube provided in the second path; a laser power supply for supplying a first high frequency power to the first discharge tube and supplying a second high frequency power having a different phase from the first high frequency power to the second discharge tube; and a matching unit including a first coil and a first capacitor to be used for impedance matching with a discharge load in the first path, and a second coil and a second capacitor to be used for impedance matching with a discharge load in the second path. Each value of the first, coil, the first capacitor, the second coil, and the second capacitor is determined such that the difference between the peak value of a voltage applied to the first discharge tube and the peak value of a voltage applied to the second discharge tube falls within a predetermined range.

BRIEF DESCRIPTION OF THE DRAWINGS

The objects, features, and advantages of the present invention will be more apparent from the following description of embodiments in conjunction with the attached drawings, wherein:

FIG. 7 is a block diagram of a gas laser oscillator according to a second embodiment of the present invention;

DETAILED DESCRIPTION OF THE INVENTION

A gas laser oscillator according to the present invention will be described below with reference to the drawings.

First Embodiment

Figure 1:
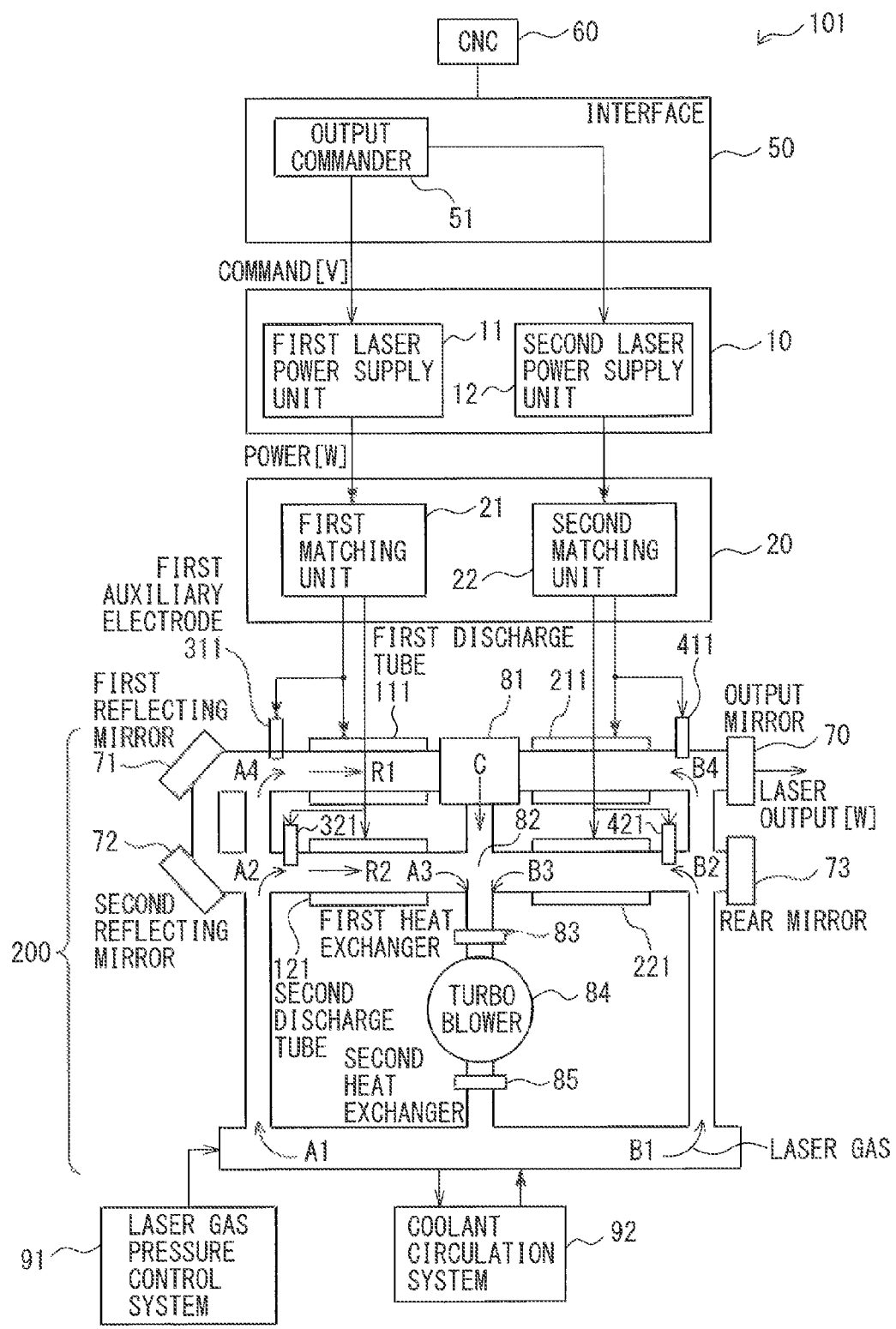
FIG. 1 is a block diagram of a gas laser oscillator according to a first embodiment of the present invention.

A gas laser oscillator according to a first embodiment of the present invention will be described. FIG. 1 is a block diagram of the gas laser oscillator according to the first embodiment of the present invention. A gas laser oscillator 101 according to the first embodiment of the present invention includes a plurality of laser gas circulation paths (R1 and R2), a first discharge tube 111, a second discharge tube 121, a laser power supply 10, and a matching unit 20.

In the example of FIG. 1, the matching unit 20 includes a first matching unit 21 and a second matching unit 22. The first matching unit 21 is connected to the first discharge tube 111 and the second discharge tube 121. The second matching unit 22 is connected to a third discharge tube 211 and a fourth discharge tube 221.

The gas laser oscillator 101 according to the first embodiment of the present invention further includes a CNC (computer numerical controller) 60 for controlling the operation of the gas laser oscillator 101, a gas circulation system 200 for circulating a gas (laser gas) functioning as a laser medium therethrough, and an interface 50 interposed between the CNC 60 and the laser power supply 10. The interface 50 is provided with an output commander 51 for outputting a voltage command to the laser power supply 10.

The laser power supply 10 applies power to the first discharge tube 111 and the second discharge tube 121, which constitute a part of the gas circulation system 200, through the first matching unit 21 of the matching unit 20.

The gas circulation system 200 includes the first discharge tube 111 and the third discharge tube 211 coupled to each other through a connection holder 81, and the second discharge tube 121 and the fourth discharge tube 221, which are connected in parallel with the first discharge tube 111 and the third discharge tube 211 and coupled to each other through a joint portion 82. The first discharge tube 111 is provided with a first reflecting mirror 71, which is a total reflection mirror, at an end of the first discharge tube 111 on the opposite side of the connection holder 81. The third discharge tube 211 is provided with an output mirror 70, which is a partial reflection mirror, at an end of the third discharge tube 211 on the opposite side of the connection holder 81. The second discharge tube 121 is provided with a second reflecting mirror 72, which is a total reflection mirror, at an end of the second discharge tube 121 on the opposite side of the joint portion 82. The fourth discharge tube 221 is provided with a rear mirror 73, which is a partial reflection mirror, at an end of the fourth discharge tube 221 on the opposite side of the joint portion 82. The structure of the optical resonator for amplifying laser light is not limited to the example shown in the drawing.

The plurality of laser gas circulation paths (R1 and R2) include a first path R1 and a second path R2. The first path R1 is a path along arrows A1, A4, and C of FIG. 1. The second path R2 is a path along arrows A1, A2, and A3 of FIG. 1. The first discharge tube 111 is provided along the first path R1. The second discharge tube 121 is provided along the second path R2. Note that, as to laser gas circulation paths on the opposite side relative to the connection holder 81, a first path R1 may refer to a path along arrows 31, B4 and C of FIG. 1, and a second path R2 may refer to a path along arrows B1, B2, and B3 thereof.

The gas circulation system 200 is filled with a laser gas, which is a laser medium that is excited and generates light. The gas circulation system 200 has a turbo blower 84. The turbo blower 84 is connected to one end of each of the first to fourth discharge tubes 111, 121, 211, and 221 through the connection holder 81 or the joint portion 82 at its suction side, and connected to the other end thereof at its discharge side. The turbo blower 84 circulates the laser gas through the gas circulation system 200, as shown by the arrows A1 to A4 and B1 to B4 in the drawing. A first heat exchanger 83 and a second heat exchanger 85 for cooling the laser gas are provided on the suction side and the discharge side of the turbo blower 84, respectively. To the first heat exchanger 83 and the second heat exchanger 85, a coolant circulation system 92 is connected to supply a coolant. A laser gas pressure control system 91 is connected to the gas circulation system 200 to control the pressure of the laser gas.

The first discharge tube 111 and the second discharge tube 121 are connected to a first laser power supply unit 11 of the laser power supply 10 through the first matching unit 21. The third discharge tube 211 and the fourth discharge one 221 are connected to a second laser power supply unit 12 of the laser power supply 10 through the second matching unit 22. The first laser power supply unit 11 of the laser power supply 10 supplies the first discharge tube 111 with a first high frequency power, and supplies the second discharge tube 121 with a second high frequency power that has a different phase from the first high frequency power. In a similar manner, the second laser power supply unit 12 of the laser power supply 10 supplies the third discharge tube 211 with the first high frequency power, and supplies the fourth discharge tube 221 with the second high frequency power that has a different phase from the first high frequency power.

Figure 2:
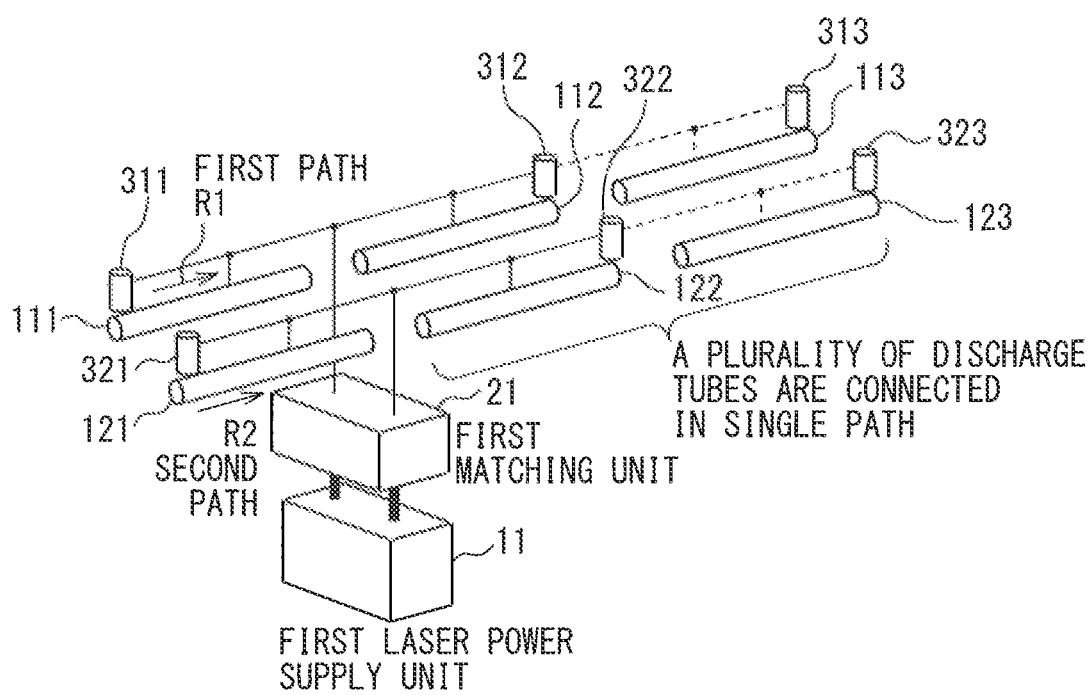
FIG. 2 is a schematic diagram of a laser power supply, a matching unit, discharge tubes, and auxiliary electrodes in the gas laser oscillator according to the first embodiment of the present invention.

FIG. 2 is a schematic diagram of the laser power supply, the matching unit, the discharge tubes, and auxiliary electrodes in the gas laser oscillator according to the first embodiment of the present invention. The first discharge tube provided along the first path R1 may be constituted of a plurality of connected tubes 111, 112, 113, . . . as shown in FIG. 2. In a similar manner, the second discharge tube provided along the second path R2 may be constituted of a plurality of connected tubes 121, 122, 123, . . . as shown in FIG. 2. First first auxiliary electrodes 311, 312, 313, . . . are formed in the vicinity of the first discharge tube 111, 112, 113, . . . , respectively. In a similar manner, second auxiliary electrodes 321, 322, 323, . . . are formed in the vicinity of the second discharge tube 121, 122, 123, . . . , respectively. Note that, as shown in FIG. 1, a third auxiliary electrode 411 and a fourth auxiliary electrode 421 are provided in the vicinity of the third discharge tube 211 and the fourth discharge tube 221, which are provided on the opposite side relative to the connection holder 81, respectively.

Figure 3:
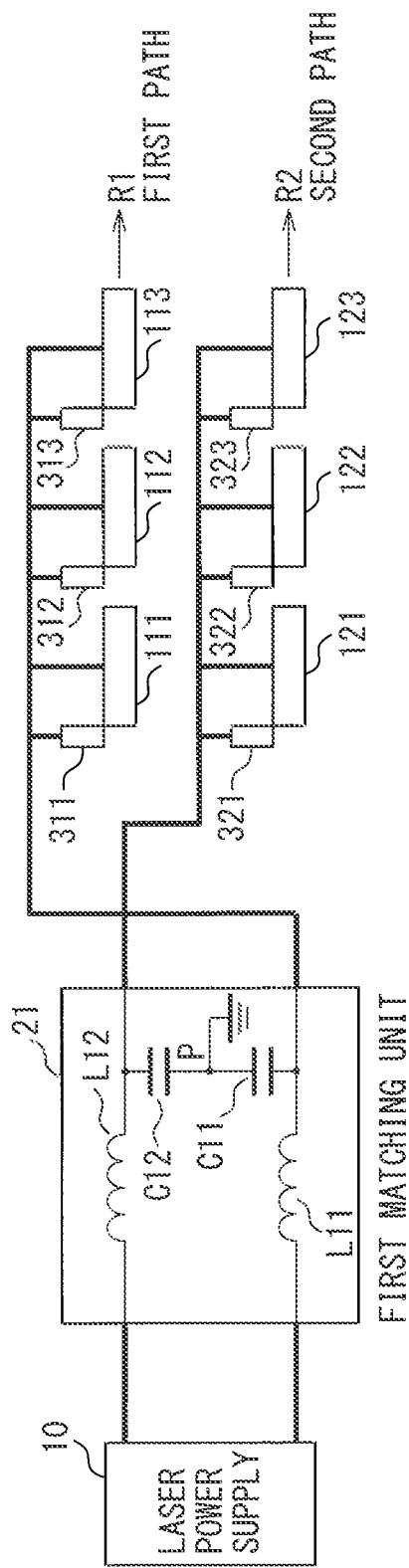
FIG. 3 is a circuit diagram of the laser power supply, the matching unit, the discharge tubes, and the auxiliary electrodes of the gas laser oscillator according to the first embodiment of the present invention.

FIG. 3 is a circuit diagram of the laser power supply, the matching unit, the discharge tubes, and the auxiliary electrodes in the gas laser oscillator according to the first embodiment of the present invention. The first matching unit 21 of the matching unit 20 includes a first coil L11 and a first capacitor C11 to be used for impedance matching (producing resonance) with discharge loads (a gas composition, a gas pressure, and the discharge tubes) in the first path R1, and a second coil L12 and a second capacitor C12 to be used for impedance matching with discharge loads in the second path R2. The first capacitor C11 and the second capacitor C12 are connected at a node P, which is grounded.

The CNC 60 has a hardware structure including a CPU, a RAM, a ROM, and the like, which are not illustrated. The CNC 60 performs various arithmetic operations, and outputs a control command to control the gas laser oscillator 101 in accordance with a predetermined operation program.

A voltage to be applied to the first discharge tube 111 provided along the first path R1 and a voltage to be applied to the second discharge tube 121 provided along the second path R2 have the same frequency. A gas composition and a gas pressure are determined so as to provide a laser power required of the gas laser oscillator 101.

In the gas laser oscillator according to the first embodiment of the present invention, each value of the first coil L11, the first capacitor C11, the second coil L12, and the second capacitor C12 is determined such that the difference between the peak value of the voltage to be applied to the first discharge tube 111 and the peak value of the voltage to be applied to the second discharge tube 121 falls within a predetermined range. When Z1 represents an impedance calculated from the first coil L11 and the first capacitor C11, and Z2 represents an impedance calculated from the second coil L12 and the second capacitor C12, Z1≠Z2 holds true. A resonance frequency f to make the impedance equal to zero may be calculated from $f=1/2\pi\sqrt{LC}$, but is preferably obtained by measurement because the values of the discharge tubes and the laser gas are difficult to calculate.

Figure 4:
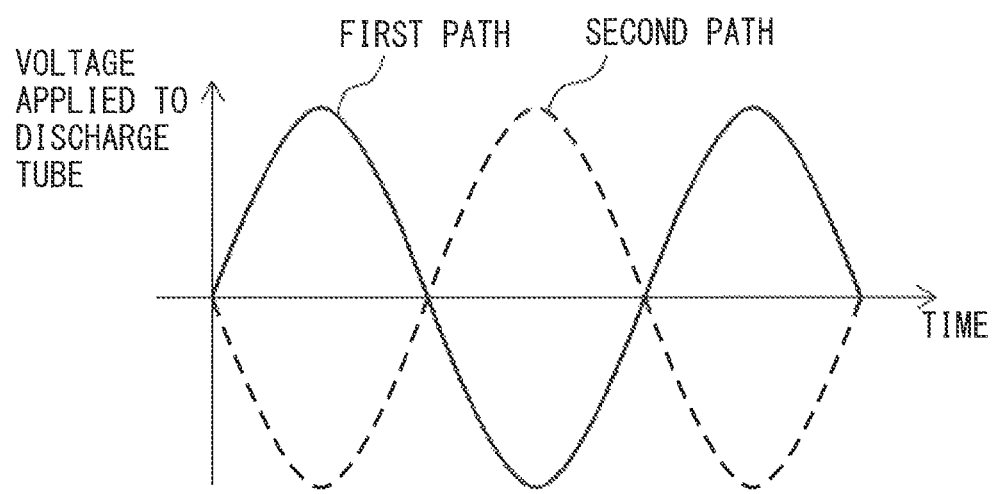
FIG. 4 is a graph showing an example of voltage waveforms, when voltages, 180 degrees out of phase with each other, are applied to the discharge tubes along a first path and a second path.

In the conventional art, the matching unit is configured so as to have equivalent component values between the two laser gas circulation paths to which voltages are applied with a phase difference of 180 degrees. Thus, equivalent discharge tube voltages are most efficiently applied to the discharge tubes, each of which is a load of each path. FIG. 4 shows an example of voltage waveforms, when voltages having a phase difference of 180 degrees are applied to the discharge tubes along the first and second paths.

Figure 5:
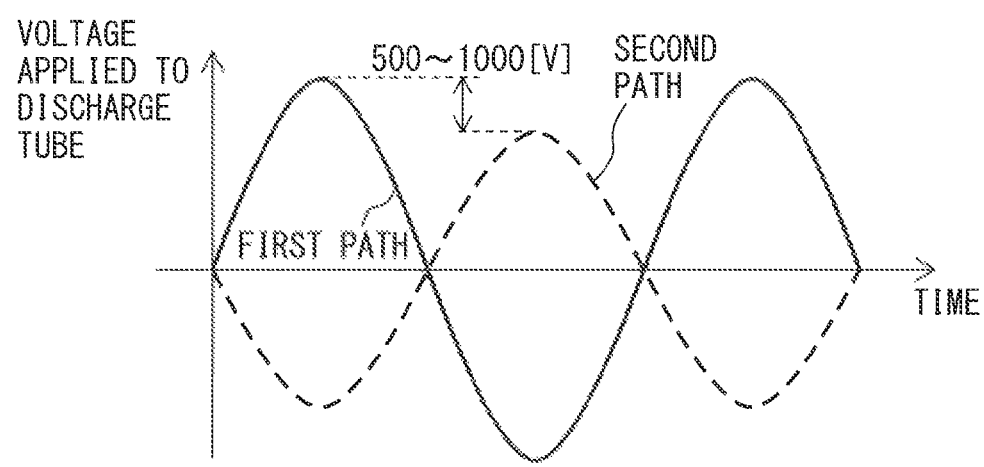
FIG. 5 is a graph showing an example of voltage waveforms, when voltages having a phase difference of 180 degrees and different peak values are applied to the discharge tubes along the first path and the second path.

In the present invention, the inductance (the number of turns) of the coil and the component value of the capacitor that are connected to the discharge tube along any one of the laser gas circulation, paths are determined so as to maximize a discharge tube voltage, as is conventionally done. The values of the other coil and capacitor that are connected to the discharge tube along the other laser gas circulation path are determined so as to have a discharge tube voltage lower by a predetermined value. FIG. 5 shows an example of voltage waveforms, when voltages having a phase difference of 180 degrees and different peak values are applied to the discharge tubes along the first and second paths. In the example of FIG. 5, the peak value of the voltage to be applied to the second path R2 is lower than the peak value of the voltage to be applied to the first path R1 by 500 to 1000 [V].

Figure 6A:
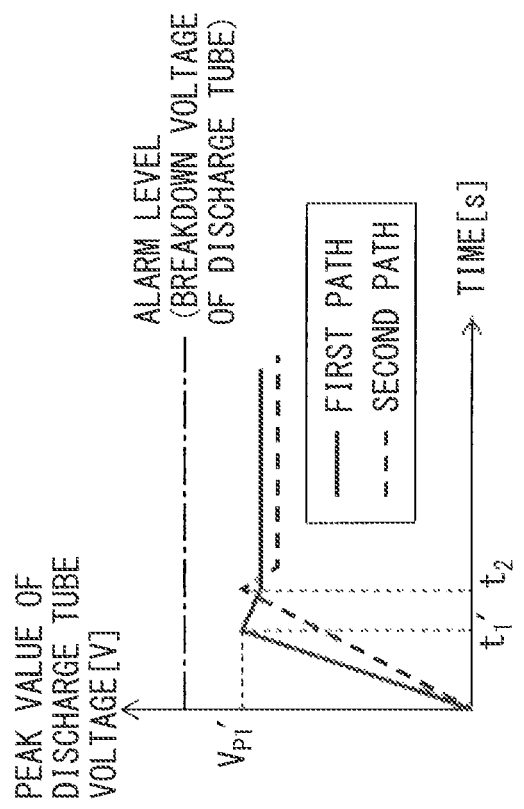
FIG. 6A is a graph of variations in voltage with time after the laser power supply is powered on, when voltages having the same peak value are applied to the discharge tubes along the first path and the second path.
Figure 6B:
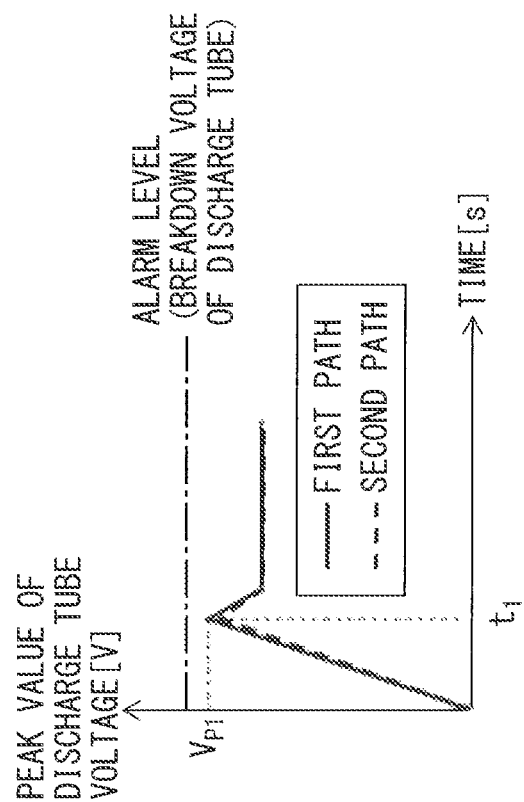
FIG. 6B is a graph of variations in voltage with time after the laser power supply is powered on, when voltages having different peak values are applied to the discharge tubes along the first path and the second path.

FIGS. 6A and 6B are graphs of variations in voltage with time after a laser power supply 10 is powered on, when voltages having the same peak value are applied to the discharge tubes along the first and second paths R1 and R2 (FIG. 6A), and when voltages having different peak values are applied thereto (FIG. 6B). As shown in FIG. 6A, when voltages having the same peak value are applied to the first discharge tube 111 along the first path R1 and the second discharge tube 121 along the second path R2, the first and second discharge tubes 111 and 121 each start a discharge at substantially the same time after a lapse of time $t_1$ from the power-on of the laser power supply 10. $V_{P1}$ represents the peak voltage of the discharge tube voltages at this time. On the contrary, as shown in FIG. 6B, the discharge tube voltage for the second discharge tube 121 along the second path R2 is lowered by the predetermined value, while the discharge tube voltage for the first discharge tube 111 along the first path R1 is as conventional. Accordingly, the first discharge tube 111 starts a discharge at a time $t_1'$ ($<t_1$), while the second discharge tube 121 starts a discharge at a time $t_2$, which is later than the time $t_1'$ by predetermined time. Since the first discharge tube 111 has started the discharge before the second discharge tube 121 starts the discharge, this discharge functions as a pilot flame and allows the second discharge tube 121 to start the discharge at a lower voltage than before without any discharge using the auxiliary electrode. In the conventional gas laser oscillator, the first discharge tube 111 and the second discharge tube 121 are required to start a discharge at the same time. However, in the present invention, since only the first discharge tube 111 starts a discharge earlier, the discharge of the first discharge tube 111 is started at a lower voltage $V_{P1}'$ than the conventional voltage ($<V_{P1}$). As a result, a discharge rise time is shortened from the conventional time $t_1$ to the time $t_1'$.

By way of example, when a maximum voltage to be applied to the discharge tubes is 4500 [V], the difference between the peak values of the voltages to be applied to the discharge tubes along the two paths is preferably 500 to 1000 [V]. If the peak value of the voltage for one of the two paths is lowered more than 1000 [V], the insulating distance between the first path and the second path is required to be long, thus having the demerits of an increase in unit size and an increase in the risk of a dielectric breakdown. Also, if the discharge tube voltage is lowered too much, a sufficient laser power cannot be obtained. If the voltage difference is less than 500 [V], as in the case of the conventional art, the effects of the present invention cannot be obtained, so the auxiliary electrode is required to be provided in the path to which the lower discharge tube voltage is applied.

The above describes an example in which the coil and the capacitor connected to the first path R1 have different values from the coil and the capacitor connected to the second path R2 in the matching unit. However, to make the different peak values of the applied voltages for the first discharge tube and the second discharge tube, a similar structure may be provided in the laser power supply, or output transformers in the laser power supply may have different numbers of turns.

Second Embodiment

Next, a gas laser oscillator according to a second embodiment of the present invention will be described. FIG. 7 is a block diagram of the gas laser oscillator according to the second embodiment of the present invention. The difference between a gas laser oscillator 102 according to the second embodiment and the gas laser oscillator 101 according to the first embodiment is that the auxiliary electrode is provided in the vicinity of only one of the first discharge tube 111 and the second discharge tube 121 to which a voltage having a higher peak value is applied. The other configurations of the gas laser oscillator 102 according to the second embodiment are the same as those of the gas laser oscillator 101 according to the first embodiment, so the detailed description thereof is omitted.

Figure 8:
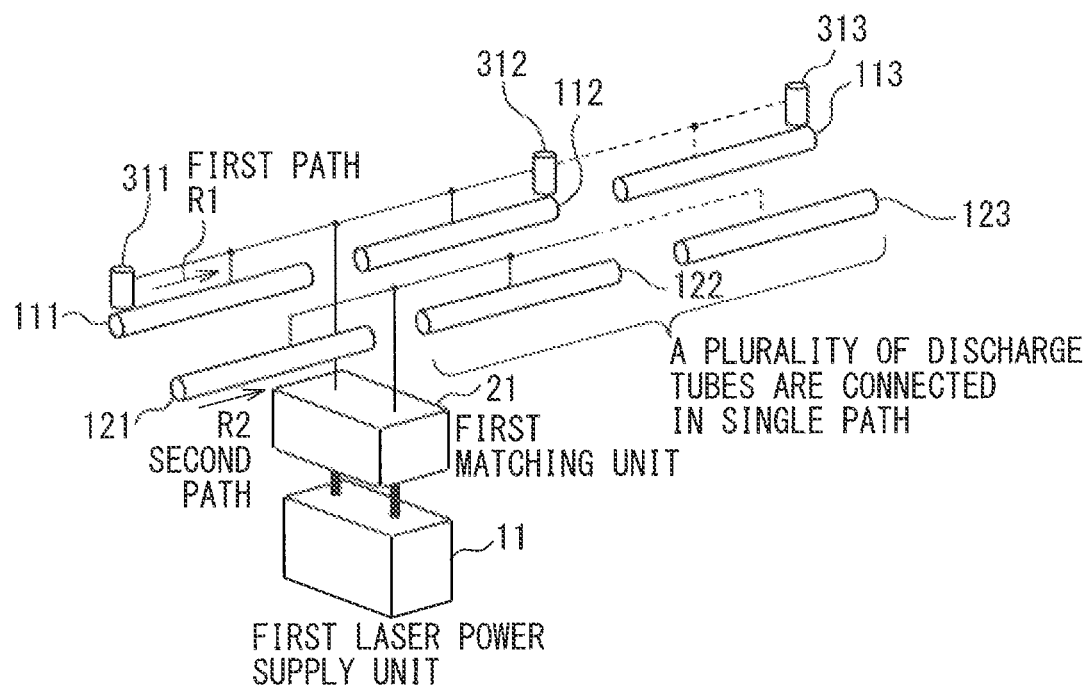
FIG. 8 is a block diagram of a laser power supply, a matching unit, discharge tubes, and auxiliary electrodes in the gas laser oscillator according to the second embodiment of the present invention.
Figure 9:
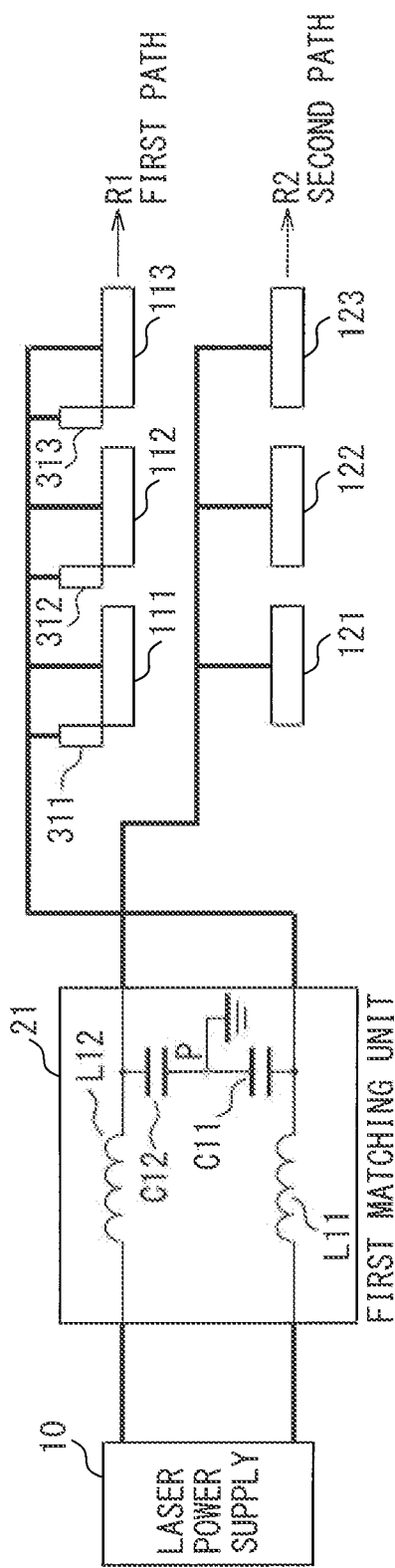
FIG. 9 is a circuit diagram of the laser power supply, the matching unit, the discharge tubes, and the auxiliary electrodes in the gas laser oscillator according to the second embodiment of the present invention.

FIG. 8 is a block diagram of the laser power supply, the matching unit, the discharge tubes, and the auxiliary electrodes in the gas laser oscillator according to the second embodiment of the present invention. FIG. 9 is a circuit diagram of the laser power supply, the matching unit, the discharge tubes, and the auxiliary electrodes in the gas laser oscillator according to the second embodiment of the present invention. In FIG. 9, the values of the first coil L11 and the first capacitor C11, in the first matching unit 21, connected to the first path R1 are determined so as to maximize the peak value of the applied voltage. On the other hand, the values of the second coil L12 and the second capacitor C12, in the first matching unit 21, connected to the second path R2 are determined so as to lower the peak value of the applied voltage by a predetermined value than that in the first path R1. As a result, as shown in FIG. 6, as with the first embodiment, a discharge in the first path R1 functions as a pilot flame for a discharge in the second path R2. Therefore, it is possible to eliminate the need for providing the auxiliary electrode in the second path R2 in the gas laser oscillator according to the second embodiment.

The above describes an example in which the auxiliary electrode is omitted in the second path R2. However, the auxiliary electrode may be omitted in the first path R1 by making an applied voltage of the first path R1 lower than that of the second path R2.

The invention of the second embodiment allows for reducing the number of the auxiliary electrodes by half, as compared with the conventional gas laser oscillator, and thus serves to reduce the costs of the gas laser oscillator and the risk of leakage problems. Also, since the auxiliary electrode and the discharge tube (main electrode) are separated, the auxiliary electrode, to which a low voltage is applied, need not be changed on a regular basis, thus serving to reduce running costs.

According to the embodiments of the present invention, it is possible to provide a gas laser oscillator that has a faster discharge rise time than in the conventional gas laser oscillators.

What is claimed is:

1. A gas laser oscillator comprising:
   a plurality of laser gas circulation paths including a first path and a second path;
   a first discharge tube provided in the first path;
   a second discharge tube provided in the second path;
   a laser power supply for supplying a first high frequency power to the first discharge tube and supplying a second high frequency power having a different phase from the first high frequency power to the second discharge tube; and
   a matching unit including a first coil and a first capacitor to be used for impedance matching with a discharge load in the first path, and a second coil and a second capacitor to be used for impedance matching with a discharge load in the second path, wherein
   each value of the first coil, the first capacitor, the second coil, and the second capacitor is determined such that a difference between a peak value of a voltage applied to the first discharge tube and a peak value of a voltage applied to the second discharge tube falls within a range from 500 V to 1000 V.

2. A gas laser oscillator comprising:
   a plurality of laser gas circulation paths including a first path and a second path;
   a first discharge tube provided in the first path;
   a second discharge tube provided in the second path;
   a laser power supply for supplying a first high frequency power to the first discharge tube and supplying a second high frequency power having a different phase from the first high frequency power to the second discharge tube; and
   a matching unit including a first coil and a first capacitor to be used for impedance matching with a discharge load in the first path, and a second coil and a second capacitor to be used for impedance matching with a discharge load in the second path,
   wherein each value of the first coil, the first capacitor, the second coil, and the second capacitor is determined such that the difference between the peak value of a voltage applied to the first discharge tube and the peak value of a voltage applied to the second discharge tube falls within a predetermined range, and
   wherein an auxiliary electrode is provided in the vicinity of only one of the first discharge tube and the second discharge tube to which the voltage having the higher peak value is applied.

* * * * *